3,390,172
N-(3-TRIFLUOROMETHYLPHENYL)-
ANTHRANILIC ACIDS
Robert A. Scherrer, Ann Arbor, Mich., assignor to Parke, Davis & Company, Detroit, Mich., a corporation of Michigan
No Drawing. Filed Mar. 27, 1964, Ser. No. 355,488
5 Claims. (Cl. 260—518)

ABSTRACT OF THE DISCLOSURE

N - (3 - trifluoromethylphenyl)anthranilic acid compounds, substituted in the N-aryl ring at position 2 by methyl or halogen and optionally substituted at position 6 by methyl or chlorine, and salts thereof, useful as anti-inflammatory agents, and their production by (a) condensing either an o-halobenzoic acid, or salt thereof, with a 3-amino-2-(methyl or halo)-4-(hydrogen, methyl, or chloro)benzotrifluoride or an o-aminobenzoic acid, or salt thereof, with a 3-halo-2-methyl-4-(hydrogen or methyl)benzotrifluoride, preferably in the presence of a copper-containing catalyst and a proton acceptor, and (b) hydrolyzing an appropriately substituted N-acylated diphenylamine compound, substituted at the position ortho to the N-acyl group by a carboxy group or a group hydrolyzable to a carboxy group.

The present invention relates to new N-aryl-anthranilic acid compounds and to methods for their production. More particularly, the invention relates to new N-(3-trifluoromethylphenyl)anthranilic acid compounds, which in their free acid form have the formula

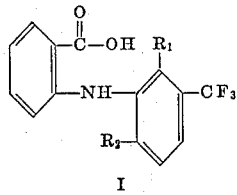

I and to salts thereof; where $R_1$ is methyl or halogen, preferably chlorine or bromine, and $R_2$ is hydrogen, methyl, or chlorine.

In accordance with the invention, N-(3-trifluoromethylphenyl)anthranilic acids having Formula I and their salts are produced by condensing a benzoic acid derivative of the formula

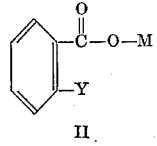

II with a compound of the formula

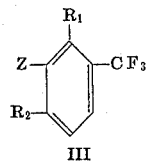

III where $R_1$ and $R_2$ have the same significance as given above; M represents hydrogen or a metal, preferably an alkali metal, and one of Y and Z is halogen, preferably bromine, and the other is amino. Best results are obtained when Y is halogen and Z is amino. When $R_1$ is bromine, Z must be amino. The reaction is preferably carried out in the presence of a copper-containing catalyst and a proton acceptor. In carrying out this condensation it is generally satisfactory to employ substantially equivalent quantities of the reactants in the presence of a suitable solvent. Some examples of such solvents are N,N-dimethylformamide, N,N-dimethylacetamide, diethylene glycol dimethyl ether, dimethyl sulfoxide, nitrobenzene, and lower aliphatic alcohols such as isopropyl alcohol, amyl alcohol, isoamyl alcohol and the like. Preferred solvents are N,N - dimethylformamide, N,N - dimethylacetamide, isopropyl alcohol, and diethylene glycol dimethyl ether. In general, the reaction is favored by temperatures in excess of 75° C. and is preferably carried out at a temperature between 80° and 150° C.

Some examples of the copper-containing catalysts which can be used in carrying out the process are various forms of mechanically divided or chemically precipitated metallic copper, such as powdered copper or spongy copper, and various copper-containing compounds such as cuprous bromide, cuprous chloride, cupric acetate, cupric carbonate, cupric oxide, cupric sulfate and the like. Cupric bromide and cupric acetate are preferred catalysts.

The quantity of the proton acceptor employed in the reactor can be varied within wide limits. In general, a sufficient amount should be used to bind the benzoic acid reactant and the hydrohalic acid formed in the course of the reaction. Some of the proton acceptors which can be used when the benzoic acid derivative is employed in free acid form are alkali metal carbonates, preferably potassium carbonate; cupric carbonate; cuprous carbonate and the like. When an alkali metal salt, preferably the potassium salt, of the benzoic acid reactant is employed, the following substances can be used as the proton acceptor: calcium hydride, alkali metal carbonates, such as potassium carbonate, and tertiary organic amines such as N-ethylmorpholine. If desired, two or more equivalents of the amine reactant can be used in which case one equivalent takes part in the condensation and the remainder acts as the proton acceptor.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

The compounds of Formula III, where Z is amino, used as starting materials in the foregoing process, can be prepared by the reaction of a 3-nitrobenzoic acid compound having the formula

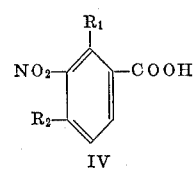

IV with sulfur tetrafluoride under pressure at a temperature of 100–200° C. to obtain a 3-nitrobenzotrifluoride compound having the formula

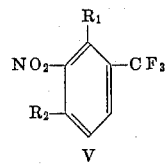

V followed by reduction of the 3-nitrobenzotrifluoride compound to give the desired starting material of Formula III. In Formulas IV and V, $R_1$ and $R_2$ have the same significance as given above.

The compounds of Formula III, where Z is halogen, also used as starting materials in the foregoing process, can be prepared by diazotization, in hydrobromic or hydrochloride acid, of a 3-amino-benzotrifluoride compound, having the formula,

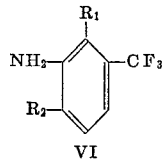

VI followed by decomposition of the diazonium salt obtained in the presence of a copper catalyst; where $R_1$ and $R_2$ are as defined before.

The compounds of the invention are also produced by hydrolysis of an N-acylated diphenylamine compound having the formula

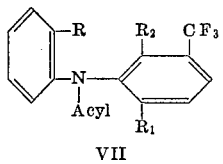

VII where $R_1$ and $R_2$ have the same significance as given above. Acyl represents an acyl radical and R is a carboxy group (either in free acid or salt form) or a group hydrolyzable to a carboxy group such as a cyano, carboalkoxy, carboaryloxy, carboarylalkoxy, carbamoyl or carbonyl halide group. The precise nature of the acyl group and the group hydrolyzable to a carboxy group is not critical because during the process the acyl group is removed and the hydrolyzable group is converted to a carboxyl group. Therefore, if desired, the acyl group and, in the appropriate cases, the group hydrolyzable to a carboxy group may contain one or more substituents such as lower alkyl, lower alkoxy, halogen, nitro, carboxy and carboalkoxy groups and as used herein the terms "acyl" and "group hydrolyzable to a carboxy group" will be understood to include the substituted as well as unsubstituted radicals. The hydrolysis can be carried out either in an acidic or alkaline medium. An alkaline medium is preferred. The hydrolysis in an alkaline medium can be effected by dissolving the N-acylated diphenylamine compound of Formula VII in a water-miscible, nonreactive organic solvent such as ethanol or methanol, adding a large excess of a concentrated aqueous solution of sodium or potassium hydroxide and allowing the hydrolysis to proceeed (with or without stirring) until the reaction is complete. The hydrolysis is favored by temperatures in excess of 75° C. and is preferably effected at temperatures ranging from 75° C. to about 150° C. The hydrolysis not only removes the N-acyl group from the N-acylated diphenylamine compound but also converts the group hydrolyzable to a carboxy group, if present, to a carboxyl group. When alkaline reaction conditions are used, the N-(3-trifluoromethylphenyl)anthranilic acid compound is present in the reaction mixture in the form of a carboxylate salt while if acidic conditions are used, it is present as the free acid.

The N-acylated diphenylamine compounds of Formula VII used as starting materials in the above process can be prepared in a number of ways. For example, a 3-aminobenzotrifluoride compound having Formula VI is reacted with an acid chloride to produce an anilide having the formula,

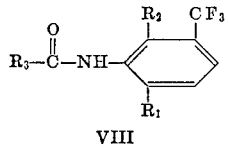

VIII the anilide compound is reacted with phosphorus pentachloride to produce a benzimidoyl chloride having the formula

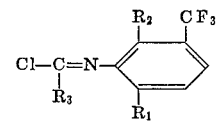

IX the benzimidoyl chloride is reacted in the presence of a base with a phenol compound having the formula,

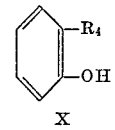

X or an alkali metal salt thereof, and the resulting imidoester having the formula,

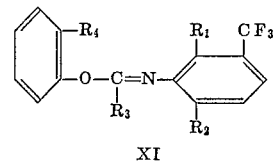

XI is subjected to intramolecular rearrangement by heating to obtain an N-acylated diphenylamine compound having the formula

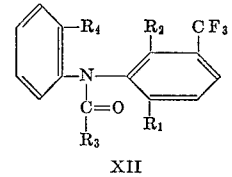

XII where $R_1$ and $R_2$ are as defined earlier; $R_3$ is a tertiary alkyl group such as a tertiary butyl group or an aryl radical, preferably a phenyl radical that may optionally contain one or more substituents, such as halogen, nitro, lower alkyl, lower alkoxy, carboxy, and carboalkoxy groups; and $R_4$ is a cyano, carboalkoxy, carboaryloxy, carboarylalkoxy, or carbamoyl group.

The N-acylated diphenylamine compounds of Formula VII wherein R is a carbonyl halide group can be prepared by the reaction of an N-acylated diphenylamine compound of Formula XII wherein $R_4$ is a carboxy group with a halogenating agent, such as thionyl chloride.

The compounds of the invention possess an extraordinarily high degree of anti-inflammatory activity and hence are of value in mitigating the symptoms associated with inflammatory conditions, as well as in preventing or suppressing the occurrence of inflammation. They also exhibit anti-pyretic activity, as well as anti-allergic activity. The anti-allergic activity of the compounds of the invention is demonstrated by their antagonism toward bradykinin. This effect is observed as a suppression of the bronchoconstriction produced by bradykinin in laboratory animals, especially in guinea pigs. They are preferably administered by the oral route. Either the free acids or pharmaceutically-acceptable salts formed with a variety of inorganic and organic bases can be used. Some typical examples of these salts are the sodium, potassium, calcium, ammonium, choline, 2-hydroxyethylammonium, bis(2-hydroxyethyl)ammonium, tris(2-hydroxyethyl)ammonium and like salts. Preferred salts are the pharmaceutically-acceptable salts of an alkali metal, an alkaline earth metal, ammonia or a substituted ammonia.

The preferred compounds of the invention, because of their high anti-inflammatory activity, are the N-(3-trifluoromethylphenyl)anthranilic acid compounds, having the formula

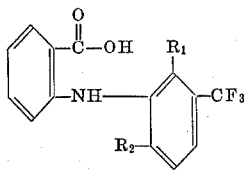

and pharmaceutically-acceptable salts thereof; where $R_1$ is methyl or chlorine, and $R_2$ is hydrogen or chlorine.

The invention is illustrated by the following examples:

EXAMPLE 1

A mixture consisting of 27.2 g. of potassium o-bromobenzoate, 13.3 g. of 3-amino-2-methylbenzotrifluoride, 9.5 ml. of N-ethylmorpholine, 2 g. of cupric bromide, and 30 ml. of dry N,N-dimethylformamide is stirred and heated under nitrogen at 125° C. for 3 hours. After cooling, the mixture is made alkaline with 2 N aqueous sodium hydroxide, diluted with an equal volume of water, and filtered. The filtrate is acidified with concentrated hydrochloric acid, and the solid N-(2-methyl-3-trifluoromethylphenyl)anthranilic acid obtained is isolated, washed with hot water, and crystallized successively from aqueous ethanol and from benzenecyclohexane; M.P. 185–187° C.

The potassium salt of N-(2-methyl-3-trifluoromethylphenyl)anthranilic acid is obtained by treating a solution of 1.0 g. of the free acid in warm ethanol with an equivalent amount of potassium hydroxide dissolved in ethanol, and evaporating the resulting mixture to dryness under reduced pressure.

N - (2-methyl-3-trifluoromethylphenyl)anthranilic acid (5.0 g.) is suspended in 30 ml. of acetone and one equivalent of diethanolamine in 20 ml. of acetone is added with stirring. The clear solution is diluted with 30 ml. of petroleum ether, and the solution is allowed to stand at room temperature. The diethanolamine salt of N-(2-methyl-3-trifluoromethylphenyl)anthranilic acid that crystallizes is collected and dried.

The product of this example, N-(2-methyl-3-trifluoromethylphenyl)anthranilic acid, can also be prepared by the reaction of potassium anthranilate with 3-bromo-2-methylbenzotrifluoride in a procedure analogous to that given above, except that the reaction mixture is heated at 125° C. for a period of 24 hours. The 3-bromo-2-methylbenzotrifluoride required as a starting material is prepared by diazotization of 3-amino-2-methylbenzotrifluoride in 48% hydrobromic acid, followed by decomposition of the diazonium salt obtained in the presence of cuprous bromide. The operating details for this procedure are identical to those reported in Organic Syntheses, Coll. vol. III, John Wiley & Sons, Inc., 1955, p. 185, for the preparation of o-chlorobromobenzene from o-chloroaniline.

EXAMPLE 2

A mixture consisting of 11.6 g. of potassium o-bromobenzoate, 9.3 g. of 3-amino-2,4-dichlorobenzotrifluoride, 0.70 ml. of N-ethylmorpholine, 1.4 g. of anhydrous cupric acetate, and 6 ml. of N,N-dimethylacetamide is stirred and heated under nitrogen at 110–115° C. for 72 hours. After cooling, the mixture is made alkaline with 2 N aqueous sodium hydroxide and extracted with petroleum ether. The aqueous phase is filtered, and the filtrate is acidified with hydrochloric acid. The precipitated solid is dissolved in aqueous ammonia, and the ammoniacal solution is treated with charcoal, and acidified with hydrochloric acid. The solid N-(2,6-dichloro-3-trifluoromethylphenyl)anthranilic acid obtained is crystallized twice from n-heptane; M.P. 185–186.5° C.

The sodium salt of N-(2,6-dichloro-3-trifluoromethylphenyl)anthranilic acid is obtained by treating a solution of 1.0 g. of the free acid in hot ethanol with an equivalent amount of sodium hydroxide dissolved in ethanol, and evaporating the resulting mixture to dryness under reduced pressure.

The ammonium salt of N-(2,6-dichloro-3-trifluoromethylphenyl)anthranilic acid is prepared by dissolving the free acid in hot ethanol, treating the solution with an excess of ammoniacal ethanol, and evaporating the mixture to dryness under reduced pressure.

EXAMPLE 3

A mixture consisting of 14.0 g. of potassium o-bromobenzoate, 10.5 g. of 3-amino-2-bromobenzotrifluoride, 5.5 g. of N-ethylmorpholine, 0.5 g. of cupric acetate, and 10 ml. of dry diethylene glycol dimethyl ether is stirred and heated under nitrogen at 120–140° C. for one hour. After cooling, the mixture is acidified with 4 ml. of concentrated hydrochloric acid and diluted further with 7 ml. of water and 2 ml. of dilute hydrochloric acid. The N-(2-bromo-3-trifluoromethylphenyl)anthranilic acid obtained is isolated, washed well with hot water and with hot 1 N hydrochloric acid, and crystallized successively from aqueous ethanol and benzene; M.P. 219–219.5° C.

N-(2-bromo-3 - trifluoromethylphenyl)anthranilic acid (2.0 g.) is dissolved in hot ethanol and an equivalent amount of calcium hydroxide in ethanol is added slowly with stirring. The resulting mixture is evaporated to dryness under reduced pressure to give the calcium salt of N-(2-bromo-3-trifluoromethylphenyl)anthranilic acid.

By utilizing a procedure similar to that described above, the following N-(3-trifluoromethylphenyl)anthranilic acid compounds are obtained from reaction of potassium o-bromobenzoate with the specified 3-aminobenzotrifluoride compounds:

(a) Reaction with 3-amino - 2,4 - dimethylbenzotrifluoride gives N-(2,6-dimethyl-3-trifluoromethylphenyl)-anthranilic acid, M.P. 181–182° C., after successive crystallizations from aqueous ethanol and n-heptane.

(b) Reaction with 3 - amino-2-chlorobenzotrifluoride gives N - (2-chloro-3-trifluoromethylphenyl)-anthranilic acid.

The preparation of the 3-aminobenzotrifluoride compounds used as starting materials in the foregoing examples can be illustrated by the preparation of 3-amino-2-methylbenzotrifluoride as follows.

A stainless steel bomb containing 70.0 g. of 2-methyl-3-nitrobenzoic acid is cooled in a Dry Ice-acetone bath. Sulfur tetrafluoride (202 g.) is added through a pressure line, and the bomb is sealed and heated at 100° C. for 3 hours and at 150° C. for 12 hours. After cooling, the bomb is vented through a sodium hydroxide solution, and the residue is washed out with a mixture of tetrahydrofuran and ether. The ethereal solution is evaporated to dryness under reduced pressure, and the residue obtained is warmed with a mixture of 200 ml. of acetone, 75 ml. of water and excess sodium carbonate. The base-insoluble portion is separated and distilled to give 2-methyl-3-nitrobenzotrifluoride; B.P. 100° C./17 mm. Hg. This product (18.0 g.) is added at 25° C. over a period of 90 minutes to a solution of 89 g. of stannous chloride dihydrate in a mixture of 145 ml. of ethanol and 98 ml. of concentrated hydrochloric acid. The resulting mixture is stirred for 3 hours at room temperature, kept at room temperature overnight, made alkaline with 25% aqueous sodium hydroxide, and extracted with ether. The ether extract is dried and evaporated to dryness to give 3-amino-2-methylbenzotrifluoride as an oil. The hydrochloride salt is prepared by treating an ether solution of this oil with an excess of anhydrous hydrogen chloride, and collecting the precipitated salt; M.P. 229–232° C. (with sublimation).

The following 3-aminobenzotrifluoride compounds are prepared in a similar manner starting from the specified 3-nitrobenzoic acid compounds;

(a) From 2,4-dichloro-3-nitrobenzoic acid there is obtained 3-amino-2,4-dichlorobenzotrifluoride; B.P. 98.5–103° C./9 mm. Hg.

(b) From 2-bromo-3-nitrobenzoic acid there is obtained 3-amino-2-bromobenzotrifluoride; M.P. of hydrochloride, 202–204° C. (with sublimation).

(c) From 2,4-dimethyl-3-nitrobenzoic acid, there is obtained 3-amino-2,4-dimethylbenzotrifluoride; M.P. of hydrochloride, 229–233° C. (evacuated capillary tube).

(d) From 2-chloro-3-nitrobenzoic acid, there is obtained 3-amino-2-chlorobenzotrifluoride.

EXAMPLE 4

A solution of 10 g. of methyl N-benzoyl-N-(2-methyl-3-trifluoromethylphenyl)anthranilate in 125 ml. of ethanol containing 45 g. of 50% aqueous sodium hydroxide is heated under reflux for 2 hours. After cooling, the solution is diluted with an equal volume of water and acidified with concentrated hydrochloric acid. The solid N-(2-methyl-3-trifluoromethylphenyl)anthranilic acid obtained is crystallized successively from aqueous ethanol and benzene-cyclohexane; M.P. 185–187° C.

The sodium salt of N-(2-methyl-3-trifluoromethylphenyl)anthranilic acid is obtained by treating a solution of 2.0 g. of the free acid in hot ethanol with an equivalent amount of sodium hydroxide dissolved in ethanol, and evaporating the resulting mixture to dryness under reduced pressure.

The ammonium salt of N-(2-methyl-3-trifluoromethylphenyl)anthranilic acid is prepared by dissolving the free acid in hot ethanol, treating the solution with an excess of ammoniacal ethanol, and evaporating the mixture to dryness under reduced pressure.

The methyl N-benzoyl-N-(2-methyl-3-trifluoromethylphenyl)anthranilate used as starting material in the foregoing procedure is prepared according to the following procedure.

A solution of 17.5 g. of 3-amino-2-methylbenzotrifluoride and 10.1 g. of triethylamine in 250 ml. of benzene is treated with 14.1 g. of benzoyl chloride, and the resulting mixture is heated under reflux for one hour and evaporated to dryness. The residue is washed well with water, dried, and dissolved in 150 ml. of benzene. The benzene solution is heated under reflux, 20.8 g. of phosphorus pentachloride is added in small portions, and heating under reflux is continued until hydrogen chloride evolution subsides. The mixture is then subjected to distillation under reduced pressure until the solvent and phosphorus oxychloride are removed, leaving a residue of N-(2-methyl-3-trifluoromethylphenyl)benzimidoyl chloride.

To a suspension of 5.1 g. of a 50% sodium hydride dispersion (mineral oil) in 100 ml. of diethylene glycol dimethyl ether maintained at 0–5° C. is added, in portions, 16.0 g. of methyl salicylate. The mixture is heated to 50° C., 38.4 g. of N-(2-methyl-3-trifluoromethylphenyl)benzimidoyl chloride is added, and the resulting mixture is heated at 100° C. for 30 minutes after the initial exothermic reaction has subsided. After cooling, the mixture is diluted with 300 ml. of ice water and extracted with ether. The ether extract is washed with water, dried, and evaporated to dryness under reduced pressure to give o-carbomethoxyphenyl N-(2-methyl-3-trifluoromethylphenyl)benzimidate. This product (20 g.) is heated at 260–270° C. for 30 minutes, and there is obtained the desired methyl N-benzoyl-N-(2-methyl-3-trifluoromethylphenyl)anthranilate.

I claim:

1. A compound chosen from the class consisting of N-(3-trifluoromethylphenyl)anthranilic acid compounds, which in their free acid form have the formula

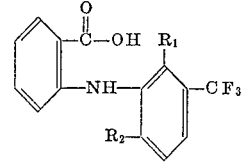

and pharmaceutically-acceptable salts thereof; where $R_1$ is chosen from the class consisting of methyl, chlorine, and bromine, and $R_2$ is chosen from the class consisting of hydrogen, methyl, and chlorine.

2. N-(2-methyl - 3 - trifluoromethylphenyl)anthranilic acid.

3. N-(2,6 - dichloro - 3-trifluoromethylphenyl)anthranilic acid.

4. N-(2-bromo - 3 - trifluoromethylphenyl)anthranilic acid.

5. N-(2,6-dimethyl - 3 - trifluoromethylphenyl)anthranilic acid.

References Cited

UNITED STATES PATENTS

| | | | |
|---|---|---|---|
| 3,107,263 | 10/1963 | Scherrer | 260—518 |
| 3,109,022 | 10/1963 | Scherrer | 260—518 |
| 3,144,387 | 8/1964 | Jones | 260—518 |

LORRAINE A. WEINBERGER, *Primary Examiner.*

L. A. THAXTON, *Assistant Examiner.*